United States Patent
Best et al.

(10) Patent No.: US 8,583,071 B2
(45) Date of Patent: Nov. 12, 2013

(54) METHODS AND CIRCUITS FOR DETECTING AND REPORTING HIGH-ENERGY PARTICLES USING MOBILE PHONES AND OTHER PORTABLE COMPUTING DEVICES

(75) Inventors: Scott Best, Palo Alto, CA (US); Gary Bronner, Los Altos, CA (US); Ely Tsern, Los Altos, CA (US)

(73) Assignee: Rambus Inc., Sunnyvale, CA (US)

( * ) Notice: Subject to any disclaimer, the term of this patent is extended or adjusted under 35 U.S.C. 154(b) by 267 days.

(21) Appl. No.: 13/144,683

(22) PCT Filed: Dec. 18, 2009

(86) PCT No.: PCT/US2009/068802
§ 371 (c)(1),
(2), (4) Date: Jul. 14, 2011

(87) PCT Pub. No.: WO2010/083006
PCT Pub. Date: Jul. 22, 2010

(65) Prior Publication Data
US 2011/0275356 A1    Nov. 10, 2011

Related U.S. Application Data

(60) Provisional application No. 61/145,397, filed on Jan. 16, 2009.

(51) Int. Cl.
H04B 1/10   (2006.01)
H04B 15/06  (2006.01)
H04B 1/00   (2006.01)
H04B 15/00  (2006.01)

(52) U.S. Cl.
USPC ........................................ 455/317; 455/63.1

(58) Field of Classification Search
USPC ............ 455/556.1, 186.1, 63.1, 67.11, 67.13, 455/570, 114.1, 271, 317; 250/472.1; 711/114
See application file for complete search history.

(56) References Cited

U.S. PATENT DOCUMENTS

| | | | |
|---|---|---|---|
| 2004/0227094 A1 | 11/2004 | Tompa et al. | 250/370.01 |
| 2006/0010346 A1 | 1/2006 | Minemier | 714/30 |
| 2006/0170541 A1 | 8/2006 | Tompa et al. | 340/500 |
| 2008/0308747 A1* | 12/2008 | Gordon et al. | 250/472.1 |

FOREIGN PATENT DOCUMENTS

| | | |
|---|---|---|
| WO | WO 2004/073326 | 8/2004 |
| WO | WO 2004/079395 | 9/2004 |

OTHER PUBLICATIONS

International Search Report and Written Opinion with mail date of Aug. 9, 2010 in International Application No. PCT/US2009/068802. 9 pages.
Newscientistspace, "Cellphone Sniffs Out Dirty Bombs", Exclusive from New Scientist Print Edition, dated Dec. 9, 2004. 4 Pages.

(Continued)

Primary Examiner — Eugene Yun
(74) Attorney, Agent, or Firm — Silicon Edge Law Group LLP; Arthur J. Behiel

(57) ABSTRACT

Described are mobile phones that incorporate radiation detectors formed using commonly available semiconductor memories. The radiation detectors require little or no additional hardware over what is available in a conventional phone, and can thus be integrated with little expense or packaging modifications. The low cost supports a broad distribution of detectors. Data collected from constellations of detector-equipped mobile phones can be used to locate mislaid or stolen nuclear materials or other potentially dangerous radiation sources. Phone users can be alerted to radiation dangers in their vicinity, and aggregated phone-specific error data can serve as user-specific dosimeters.

22 Claims, 5 Drawing Sheets

(56) References Cited

OTHER PUBLICATIONS

US Nuclear Regulatory Commission, "Dirty Bombs" dated Mar. 2003 from the Office of Public Affairs, Washington, DC 20555. 3 Pages.

"Error Detection and Correction", dated Oct. 29, 2008 from Wikipedia. 11 Pages.

iPhone Block Diagram.png (PNG Image, 757x557 pixels) dated Oct. 23, 2008. 1 Page.

"Lost and Stolen Nuclear Materials in the United States" dated Oct. 28, 2008, Three Mile Island Alert Security Committee Chairman Scott Portzline. http://www.tmia.com/industry/lost.html. 20 Pages.

May, Timothy et al., "Alpha-Particle-Induced Soft Errors in Dynamic Memories", IEEE Transactions on Electron Devices, vol. ED-26. No. 1, Jan. 1979. 8 Pages.

Sutherland, Benjamin, "My Blackberry As a Bomb Sniffer?," dated Oct. 6, 2008, Newsweek, http://www.newsweek.com/id/161056. 2 pages.

RadTrucks Monitor Highways for Nuclear Materials, The Independent, Local News Source dated Oct. 9, 2008. 2 Pages.

"Soft error", from Wikipedia, http://en.wikipedia.org/w/index.php?title=Soft_error&printable=yes, dated Sep. 17, 2008. 8 Pages.

"Soft Errors in Electronic Memory—A White Paper," dated Jan. 5, 2004, Tezzaron Semiconductor, www.tezzaron.com. 7 Pages.

Seifert, Norbert et al., "Historical Trend in Alpha-Particle induced Soft Error Rates of the Alpha Microprocessor", IEEE 01CH37 167. 39th Annual International Reliability Physics Symposium, Orlando, Florida, 2001. 7 Pages.

PCT International Preliminary Report (Chapter II) mailed Oct. 18, 2011 re Int'l. Application No. PCT/US09/68802 filed Dec. 18, 2009. 6 Pages.

* cited by examiner

METHODS AND CIRCUITS FOR DETECTING AND REPORTING HIGH-ENERGY PARTICLES USING MOBILE PHONES AND OTHER PORTABLE COMPUTING DEVICES

FIELD

This invention relates to the field of portable radiation detectors, and in particular to inexpensive detectors that are easily integrated into cellular telephones and other types of portable computing devices.

BACKGROUND

Governments and their associated first responders are increasingly interested in protecting their citizenry from exposure to dangerous levels of radiation that might result from accidental or purposeful release of nuclear materials. In a current high-profile example from recent media reports, the United States Department of Homeland Security suspects terrorist organizations of planning to build and explode a so-called "dirty bomb" in the United States. Less newsworthy, but nevertheless troubling, dangerous nuclear materials are commonly lost or stolen.

BRIEF DESCRIPTION OF THE DRAWINGS

The subject matter presented herein is illustrated by way of example, and not by way of limitation, in the figures of the accompanying drawings and in which like reference numerals refer to similar elements and in which.

DETAILED DESCRIPTION

"Soft errors" in electronic circuitry are signals that represent erroneous data, but not due to an error in the design or operation of the circuitry. If detected, a soft error can be corrected by simply restoring the errant signal to the correct state. Soft errors can occur in a broad range of electronic devices, but are most commonly observed in semiconductor memories (e.g., SRAM, DRAM). A memory circuit's exposure to high-energy particles can induce soft errors or contribute to an increase in soft-error rates. Memories, for example, store information as a plurality of bits that are susceptible to transient state changes caused by high-energy particles. Radioactive contaminants in circuit packaging and cosmic radiation are common sources of these particles, and are consequently causes for soft errors.

Applicants have employed soft-error detection to innovate an inexpensive radiation detector that can, for example, help locate potentially dangerous radiation sources. Some embodiments use commonly available semiconductor memory that also serves the need of cell-phone applications. The radiation detectors, in some embodiments, thus require little or no additional hardware, and can be integrated into common cell phones without modified packaging.

Figure 1:
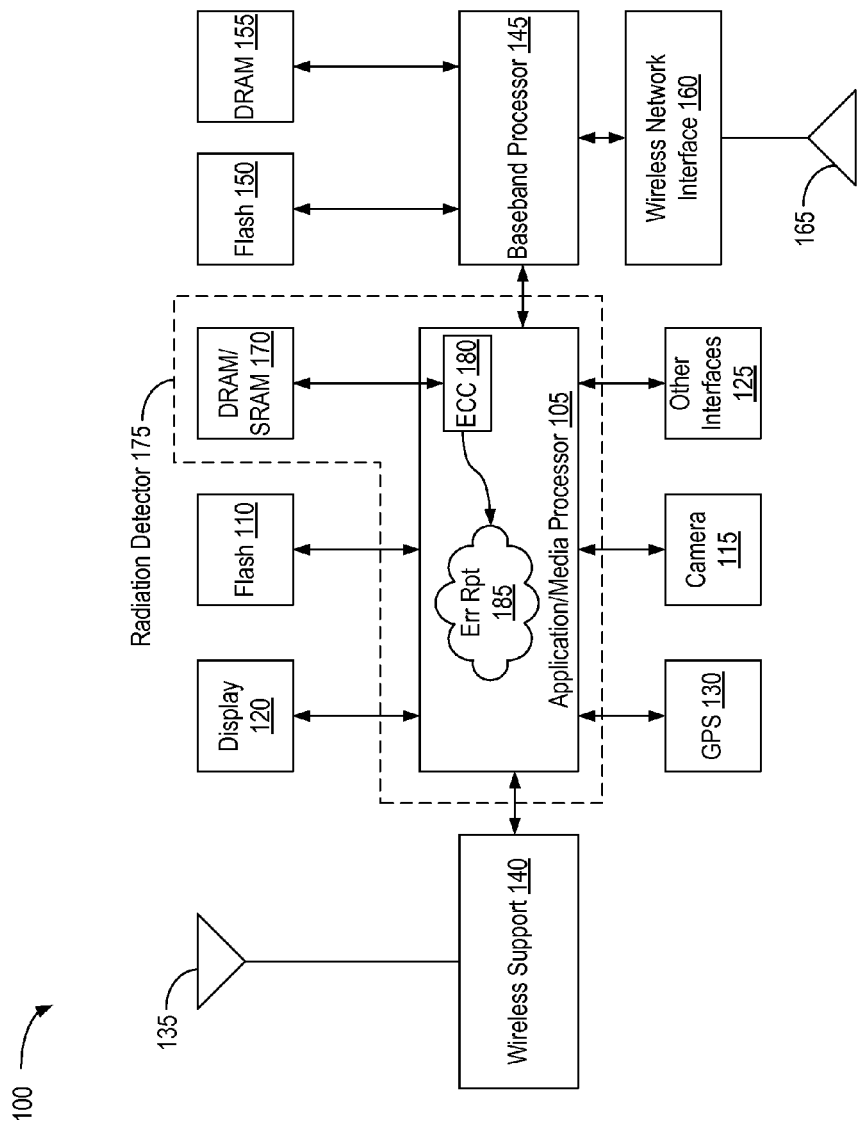
FIG. 1 is a block diagram of a cell phone 100 adapted to sense and report soft errors in accordance with one embodiment.

FIG. 1 is a block diagram of a mobile phone 100 adapted to sense and report soft errors in accordance with one embodiment. Phone 100 is a "smart phone" portable device in that it supports a range of features beyond simply cellular or satellite communication (e.g., web access, location-based services, multimedia applications etc.). An application/media processor 105 at the heart of phone 100 is typically a single integrated circuit that processes and manages programs stored in a flash memory 110. Such programs might support, for example, Internet access, e-mail and text messaging, and the display and sharing of still and moving images. Processor 105 supports various user interfaces, including a camera 115 and display 120. Other interfaces 125 include e.g. a microphone, microphone jack, an infrared port, a Bluetooth wireless port, and a Wi-Fi wireless network connection. Phone 100 may also include a Global Positioning System ("GPS") receiver 130.

Phone 100 includes one or more antennas 135 that are coupled to processor 105 via a respective interface or interfaces 140 in support of e.g. Wi-Fi, Bluetooth, and GPS functionality. Phone 100 additionally includes a conventional baseband processor 145, supported by flash and DRAM memories 150 and 155, that executes instructions in support of communication with cell networks (FIG. 3) via a wireless network interface 160 and antenna 165. Network interface 160 is a cellular front end in this embodiment, and is adapted to communicate with a cellular network via antenna 165.

Processor 105 and supporting memory 170 are encompassed within a dashed boundary, the contents of which serve as a radiation detector 175 in accordance with one embodiment. The components outside the dashed boundary are conventional and well understood, so a detailed treatment is omitted for brevity.

Processor 105, and possibly memory 170, is modified in accordance with the depicted embodiment in support of soft-error detection and reporting. A combination of hardware and software that realizes a "soft error detection capability" (SEDC) 180 is added to radiation detector 175 such that it utilizes the existing memory arrays within a local memory 170 and the processing core of application processor 105 to perform its detection. An SEDC implementation 180 can be integrated in conjunction with memory 170 or processor 105, or can be provided on a separate integrated-circuit (IC) device. Wherever located, an SEDC implementation 180 detects soft errors created in memory 170 (or created within cache memory contained within processor 105) and reports detected errors to an error-reporting application 185 executing on processor 105 or elsewhere. Similar to SEDC, application 185 can be implemented in hardware or as a program executing on general-purpose hardware.

Memory 170 can be a single, a plurality of, or multiple types of integrated circuit memory devices, e.g. synchronous dynamic random-access memory (SDRAM), static random-access memory (SRAM), or a mixture of device types. Other types of random-access memory or processor cache memory (not shown) might also be used. Memory 170 may additionally include some measure of storage for redundant information that follows certain algebraic or geometric relations to the stored data to facilitate error detection or correction. When enhanced with such error correction, memory 170, or a portion thereof, can be selected to be relatively sensitive to soft errors, increasing the utility of the SEDC process, while still providing error-correction codes that compensate the resultant soft errors, and allow normal memory operations to operate undisturbed.

There are a number of ways to modify the sensitivity of memory 170 to soft errors. In general, soft-error sensitivity is inversely proportional to capacitance and voltage. A parameter Qcrit commonly used to describe a logic circuit's soft-error sensitivity is therefore a function of capacitance and voltage. Qcrit is a measure of the minimum electrical charge disturbance needed to induce an error. Memory 170 can therefore be designed or selected so provide a relatively low measure of Qcrit to increase soft-error sensitivity. Other variables that can be manipulated to provide a desired degree of radiation sensitivity for a memory device include the types of IC packaging and substrate materials, and the type and geometry of the memory cells. In embodiments in which memory 170 includes an area made more sensitive to high-energy particles, the relative proportion of errors in sensitive area can be used to better identify soft-errors induced by charged particles. For example, read errors uniformly distributed across memory 170 are less likely to result from high-energy particles than read errors concentrated in the area of memory 170 designed with a relatively low Qcrit.

Figure 3:
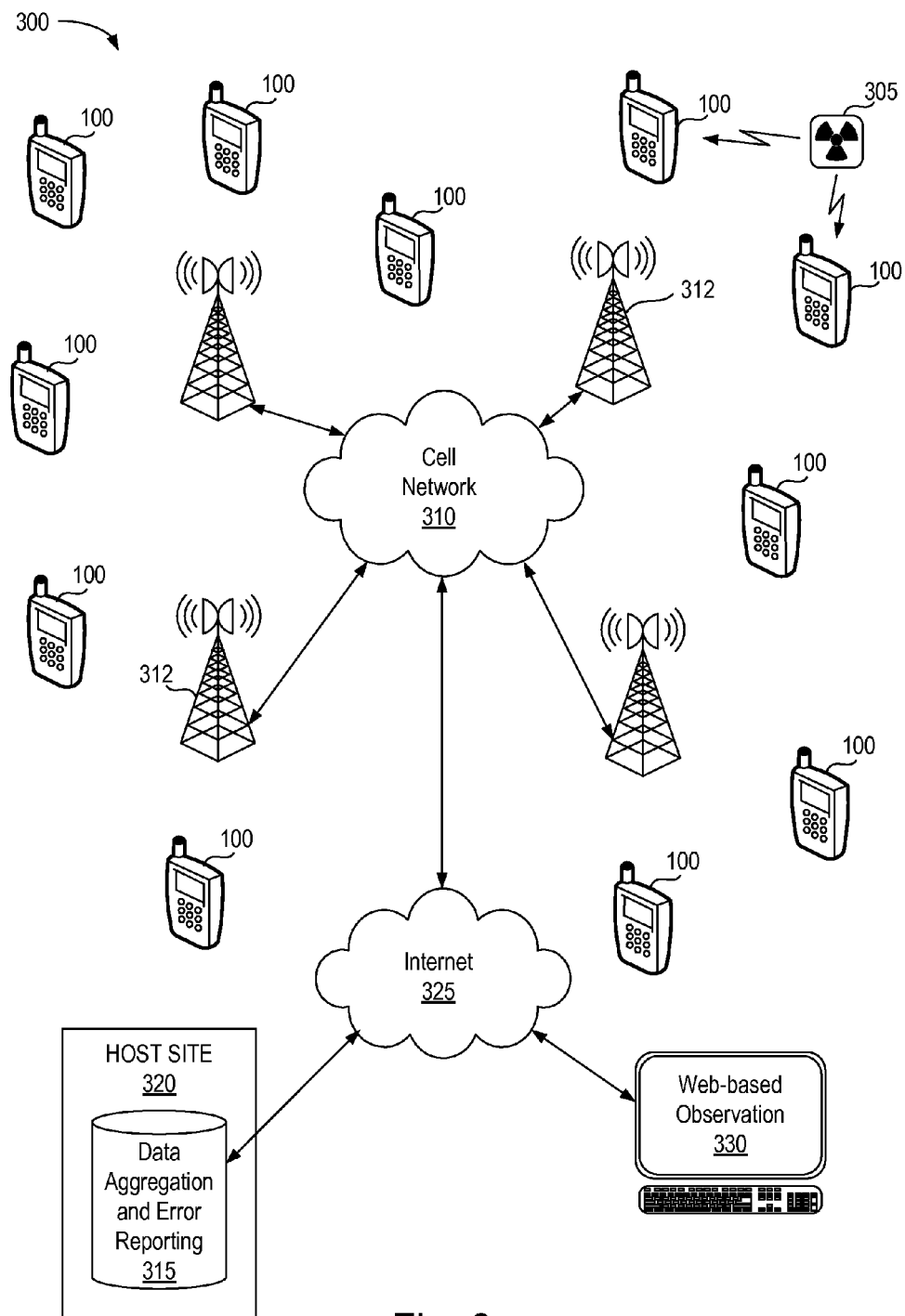
FIG. 3 depicts a system 300 that employs a constellation of cell phones 100 to locate a radiation source 305.

In some embodiments, error data is recorded on the phone device, in nonvolatile storage (e.g., in flash memory 110) before being uploaded to an aggregation server available within the cellular network or via the Internet (FIG. 3). Compounded error data, particularly where the errors are correlated with radiation exposure using data from other devices, can be maintained for a cell-phone user via this aggregation server. The cumulative exposure measure can serve as a personal dosimeter that maintains a measure of the user's exposure to radiation. The cumulative data is best maintained at the aggregation server, as there could be megabytes of data generated by each user, which would overwhelm the local storage capabilities of the individual user's smartphone. Further, the aggregation server has access to error information from many detectors, and can thus provide a more aggregate assessment of radiation exposure than a single detector. The aggregation server may consider information from more sophisticated detectors as well. For example, a cell-based detector network can be used to spot problem areas that deserve increased scrutiny. Further study of problem area may yield a better understanding of the threat, if any, and this better information can be used to improve dosimeter data and better calibrate cell-based detectors.

Figure 2:
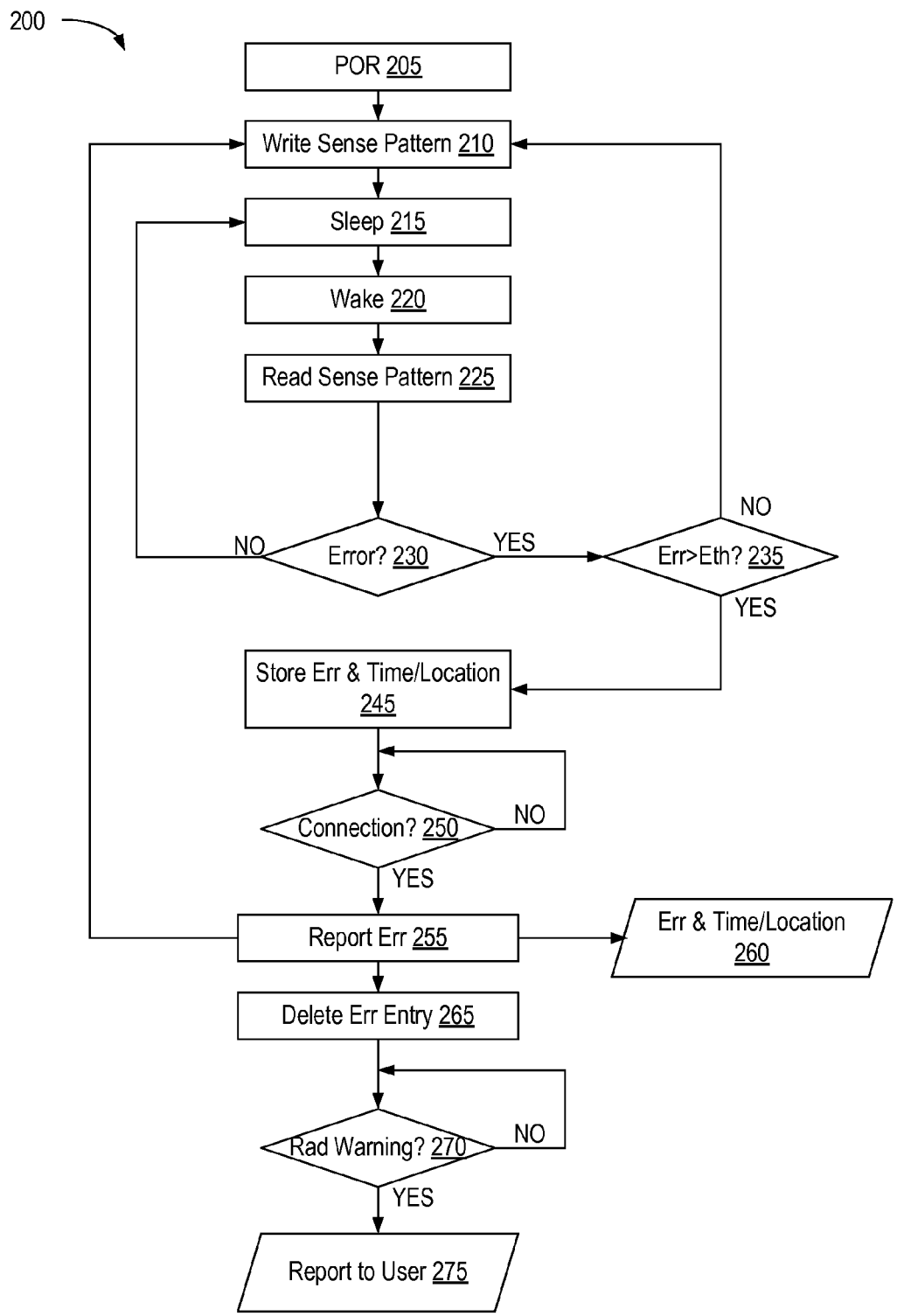
FIG. 2 is a flowchart 200 depicting the operation of an embodiment of radiation detector 175 of FIG. 1.

FIG. 2 is a flowchart 200 depicting the operation of an embodiment of radiation detector 175 of FIG. 1. The process begins at step 205 when phone 100 is powered on and consequently undergoes a power-on-reset (POR) operation to ready the phone for operation. Next, an initialization process associated with SEDC 180 writes a "test pattern" into a portion of memory 170 (step 210). This can be readily done by a software application simply by initializing a large static array (e.g., a 1 MB array). The specific test pattern can be selected to facilitate soft error detection. For example, if memory 170 is more susceptible to radiation-induced upsets that change stored levels representative of a logic one to levels representative of a logic zero than vice versa, then the test pattern could be all ones. In that case an error could be detected by simply reading the pattern back periodically and counting the number of zeroes. In other embodiments the test pattern written after power up or subsequently can be any data and instructions the application or baseband processors happen to be executing. Though not shown, the initialization process associated with SEDC 180 may immediately read back the test pattern to ensure it was written properly. Write verification prevents SEDC 180 from later interpreting a write error as a soft error.

Once the test pattern has been initialized and is resident in memory, the overall SEDC process next moves to a low-power "sleep" mode (step 215) in which the test pattern is retained but the software is otherwise quiescent. Upon waking (step 220), an error-checking process associated with SEDC 180 reads back the test pattern (step 225) and checks it for errors. Per decision 230, if there are no errors, the overall SEDC process returns to the low-power sleep state. If there are errors but these do not rise above some predefined or dynamic error threshold, decision 235 returns the process to step 210 for the initialization process to re-initialize the test pattern. If the errors do exceed the threshold (and the threshold could very well be "more than zero errors"), then the error checking process records error information, such as a value representative of the number of soft-errors detected within memory 170 (step 245). When the error checking process records the error result (e.g., within non-volatile storage on the smartphone device), it may augment the error information with a time stamp and/or location information from e.g. GPS 130 of FIG. 1 to correlate the error signal or signals with a time and position. Alternatively, the error checking process may record all error results, even the "no errors detected" results, along with a time stamp and/or location information. In other embodiments the radiation detector can identify its location by triangulating with neighboring cellular antennas, or the cellular network that includes the antennas can similarly locate the detector.

When the overall SEDC process determines that it has error information to report (e.g., the number of locally stored error events exceeds some threshold), an error reporting process 185 associated with SEDC 180 determines whether a connection exists for reporting the information to the aggregation server (decision 250). When a connection is available, the error reporting process 185 "uploads" the locally stored error data and any associated location or time information (step 255) to the host system and returns to step 210 to await the arrival of new errors. Reported error information 260 can be conveyed to the host via e.g. cellular front end 165 or some other network resource. Optionally, the smartphone may secure the data transmission to the aggregation server as well as verify its authenticity via common network communication protocols such as HTTPS. Where GPS location data is unavailable, as where the phone lacks the requisite receiver or is positioned where GPS reception is lacking, the phone's cell network may provide location-based information directly to the aggregation server (e.g., the cellular network may include a service that replies to requests from the aggregation server, as to where a specific client was during a particular time period associated with a recorded time stamp). Once the error reporting process uploads its data to the aggregation server, the error information can be deleted from the smartphone itself (step 265).

The presence of soft errors detected by this process may not indicate a danger, as soft errors can result from innocuous sources. The embodiment of FIGS. 1 and 2 thus elects not to alert the user of cell phone 100 of any errors. Other embodiments of the SEDC process could very well involve user-alerts, perhaps generated in conjunction with the aggregation server. As shown in FIG. 3, the aggregation server preferably has access to error data from many cell phones, and has location information that may help a specific cell phone 100 distinguish between false alarms and serious threats. For example, the host might send a warning notice to cell phone 100 only if other phones in the same general area exhibit anomalously high soft-error rates, or the host may elect not to warn the cell-phone user of radiation upsets that commonly occur at the reported levels in a dentist's office (where X-rays are routinely taken) or that are occurring widely due to e.g. sun-spot activity. In the embodiments shown, the SEDC process thus awaits an emission reporting signal, such as a radiation warning, from the aggregation server (decision 270) before sending an alert (e.g. a display message 275) to the user. The alert message may identify the area of danger, direct the user to a safe area, or otherwise assist the user.

In some embodiments the SEDC process does not warn the user responsive to all emission reporting signals, but may e.g. aggregate the results from multiple emission reporting signals and alert the user only when the aggregate measure exceeds a predetermined threshold. A user interface to the aggregate measure can also be provided to allow the phone to serve as a convenient personal dosimeter. In other embodiments each emission reporting signal indicates that high-energy particle emissions in the user's vicinity are at or above a dangerous level and the user's phone accordingly alerts the user immediately to the perceived threat.

FIG. 3 depicts a system 300 that employs a constellation of mobile phones 100 to locate a radiation source 305. In this embodiment, a widely dispersed collection of phones 100 reports error information via a cell network 310, which includes a distributed collection of cellular antennas 312 (though not shown, cell network 310 is commonly connected to a public switched telephone network). In other embodiments, the mobile devices may use satellite or short-range wireless networking (e.g., WiFi, Bluetooth, ZigBee, etc.) to interconnect their users. An aggregation server 315, shown as data aggregation and error-reporting storage at a host site 320, may be coupled to the wireless network via e.g. the Internet 325 or some other suitable connection. System 300 additionally supports web-based observation 330 of error reporting for e.g. cell-phone users, law-enforcement, government agencies or the general public. Garnering data from a large number of phones allows processes associated with the aggregation server to map radiation patterns, identify movement of radioactive materials, and issue warnings when needed, and otherwise publish helpful information relating the position and movement of radiation sources. System 300 forms a radiation monitoring network similar to RadNet now under development at Lawrence Livermore national Laboratory, but as the entire SEDC process can be implemented in software installable by the end-user, adding this capability to cell phone 100 is expected to be smaller and less expensive in our technique than in techniques which exhibit similar functionality and include other forms of radiation detectors.

Figure 4:
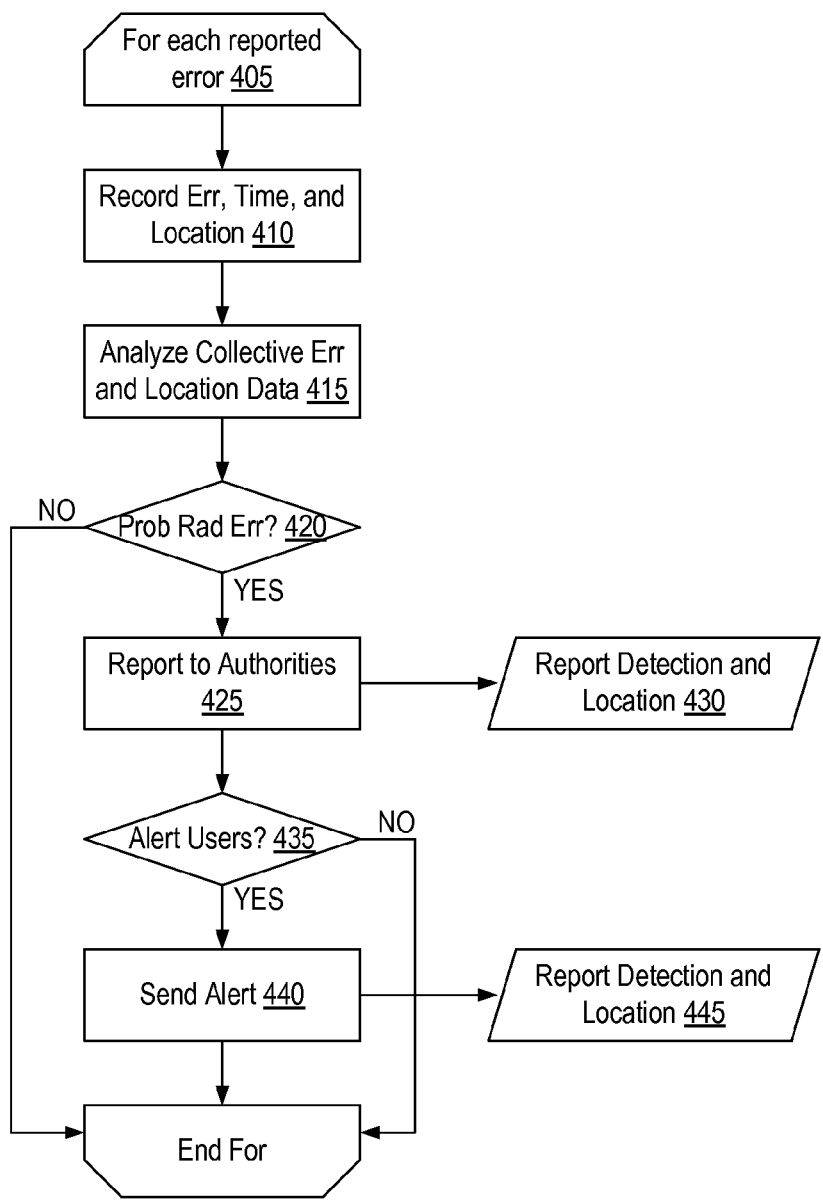
FIG. 4 is a flowchart 400 depicting the operation of host 320 of FIG. 3 in accordance with one embodiment.

FIG. 4 is a flowchart 400 depicting the operation of aggregation server 320 of FIG. 3 in accordance with one embodiment. Flowchart 400 is depicted as a "for-loop" that begins with receipt of error data (step 405) from one of the phone devices 100. The error data and corresponding time and location information is recorded in a database along with other similar data from other phone devices (step 410). Error data may be sorted by time and location to reduce false positives (step 415). If the collective error information for a given location indicates a probable radiation hazard (decision 420), in step 425 a public safety alert process associated with aggregation server 320 reports the problem and location information (430) to some pre-designated authority, such as the local fire department or other first-responders.

Depending upon such factors as the severity of the perceived danger and the possibility of panic, aggregation server 320 may elect to alert users to the problem (decision 435). If an alert is to be sent (step 440), the alert 445 may be limited to users in the area of exposure or may extend to other users who are near or are expected to enter the area of exposure. User's driving toward the scene of a nuclear spill might, for example, be directed around the accident via a report 445 identifying the location of the spill. Report 445 is not limited to participating phones, but can also be sent to e.g. GPS receivers or traffic reporting services to direct traffic away from hazards.

Figure 5:
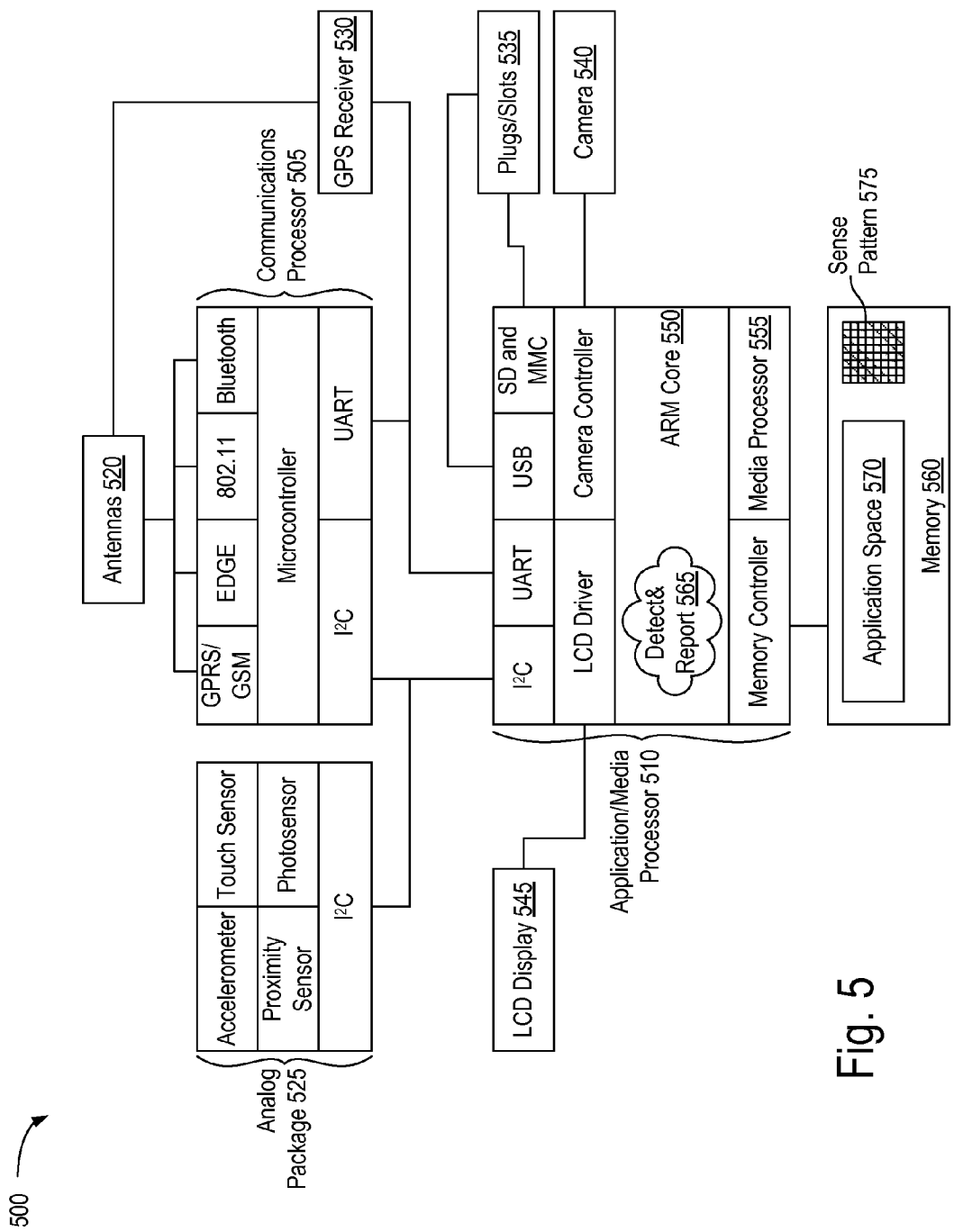
FIG. 5 is a block diagram of an iPhone 500, an Internet-connected multimedia smart phone available from Apple Inc. of Cupertino, Calif.

FIG. 5 is a block diagram of an iPhone 500, an Internet-connected multimedia smart phone available from Apple Inc. of Cupertino, Calif. Phone 500 may be adapted for use as a radiation detector in accordance with one embodiment with little or no hardware modifications. In one embodiment, for example, an iPhone can be configured for use as a radiation detector using a software application downloaded over the Internet. Phone 100 is one of many readily available platforms easily adapted for use as a radiation detector. Phone 500 and its constituent components are well understood by those of skill in the art. A brief description of the phone systems and subsystems is provided for context.

Phone 500 includes two processors, a communications processor 505 and an application/media processor 510, that are interconnected by a pair of serial interfaces $I^2C$ (for Inter-Integrated Circuit) and UART (for Universal Asynchronous Receiver/Transmitter). Communications processor 505, sometimes called a baseband processor, supports widely used wireless communication protocols, GPRS/GSM, EDGE, 802.11, and Bluetooth, and is coupled to a respective set of antennas 520 for this purpose. The GPRS/GSM block, part of the cellular front end, can be adapted to support different cellular communication standards in other embodiments. Phones in accordance with still other embodiments communicate via networks other than cellular networks, in which case the function of the cellular front end is provided by a different form of wireless network interface.

Processor 510 is at the heart of the phone, and includes support for a number of input/output devices in addition to what is provided by the communications processor. An analog package 525 includes an accelerometer, a touch sensor, a proximity sensor, and a photosensor. The accelerometer allows the application processor to sense changes in phone orientation, the touch sensor supports the user interface, the proximity sensor senses e.g. that the phone is near or far from the user's cheek or the difference between a cheek and a fingertip, and the photosensor provides a measure of ambient light for e.g. adjusting display backlighting. Other useful input comes from a GPS receiver 530, plugs/slots 535 that support memory cards and a USB port, and a camera 540. Other sensors, such as a microphone, are not shown. User output is provided by an LCD display 545 and, though not shown, a speaker, headphone jack, and a motor supporting a vibrating alert.

Processor 510 includes two sub-processors, a general purpose ARM (Advanced RISC Machine) core 550 and a media processor 555 dedicated to the efficient processing of audio and video data. A memory device or module (multiple memory die) 560 stores instructions and data for processor 510. Memory 560 is implemented using e.g. synchronous dynamic random access memory (SDRAM).

Phone 500 is programmed, in accordance with one embodiment, to execute an application 565 that detects and reports soft errors in memory 560. In one embodiment the hardware in phone 500 is unchanged to support error detection, and application 565 follows the process outlined in flowchart 200 of FIG. 2. The details of that implementation are not repeated here. In other embodiments phone 500 may be modified to increase the soft-error rate, and thus to provide more sensitivity to hazardous particle detection. Memory 560 may be modified as noted previously to increase soft-error sensitivity, in which case application 565 can implement error correction to offset memory errors with processor gain. Alternatively, memory 560 can includes a portion, such as an additional die or a portion of a die, that is dedicated for use in soft-error detection. Memory 560 would thus be divided into application space 570 in support of communication and media processing and an array 575 that defines an error-detection space to receive sense patterns for soft-error monitoring. In some embodiments memory 560 includes SEDC hardware that reports errors to processor 510 by e.g. writing to a register. The portion of array 575 used to store the sense pattern need not be contiguous memory cells. Finally, in some embodiments, the error-detection array 575 may be a "read/reset only" portion of memory which can only be read and initialized, but not written to. In such an embodiment, the only means of creating a "bit flip" (e.g., turning a stored logic-1 into a logic-0, or vice-versa) is a soft-memory error. Even malicious software running on the same hardware could not inject memory errors into the array 575 in this embodiment.

In the foregoing description and in the accompanying drawings, specific terminology and drawing symbols are set forth to provide a thorough understanding of the present invention. In some instances, the terminology and symbols may imply specific details that are not required to practice the invention. For example, the cell phones discussed above are "smart phones" that support many services in addition to the standard voice functions. Radiation detectors in accordance with other embodiments can be incorporated into relatively simple cell phones with relatively minor hardware, software, or firmware modifications. Portable computing devices other than phones, such as palm-top and lap-top computers, can be equipped as detailed herein to serve as radiation detectors and reporting devices.

While the present invention has been described in connection with specific embodiments, variations of these embodiments will be obvious to those of ordinary skill in the art. Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. In U.S. applications, only those claims specifically reciting "means for" or "step for" should be construed in the manner required under the sixth paragraph of 35 U.S.C. Section 112.

What is claimed is:

1. A mobile phone for communicating over a wireless network, the phone comprising:
    a memory having a memory array to store information as a plurality of bits that are susceptible to transient state changes caused by high-energy particles, wherein the transient state changes corrupt the stored information;
    an application processor coupled to the memory to execute instructions stored in the memory;
    an error detector coupled to the memory to issue an error signal responsive to the state changes that corrupt the stored information; and
    a wireless network interface coupled to the error detector, the wireless network interface to transmit a wireless error-reporting signal to the network reporting the error signal.

2. The mobile phone of claim 1, wherein the information stored in the memory includes the instructions.

3. The mobile phone of claim 1, further comprising a GPS receiver to provide position data, wherein the application processor correlates the error signal with contemporaneous position data.

4. The mobile phone of claim 1, further comprising a GPS receiver to provide position data, wherein the wireless error-reporting signal includes the error signal and contemporaneous position data.

5. The mobile phone of claim 1, further using triangulation with neighboring cellular antennas to provide position data, wherein the wireless error-reporting signal includes the error signal and contemporaneous position data.

6. The mobile phone of claim 1, wherein the application processor is integrated with the error detector on an integrated-circuit device.

7. The mobile phone of claim 6, wherein the memory is integrated with the error detector and the application processor on the integrated-circuit device.

8. The mobile phone of claim 1, wherein the memory is instantiated on an integrated circuit.

9. The mobile phone of claim 1, further comprising a user display, wherein the application processor issues a radiation warning to the user display after both transmitting the error-reporting signal and receiving error confirmation from the network.

10. A method of alerting a user of a portable computing device to high-energy particles, wherein the portable computing device is equipped with memory and adapted to communicate with a wireless network, the method comprising:
    writing information to the memory;
    periodically reading the information and applying a error detecting code to the read information to detect errors;
    transmitting a wireless error-reporting signal to the wireless network;
    awaiting an emission reporting signal from the network;
    storing emission data in the portable computing device responsive to the emission reporting signal; and
    displaying an alert to the user on the portable computing device responsive to the emission data.

11. The method of claim 10, further comprising aggregating the emission data from a plurality of emission reporting signals before displaying the alert.

12. The method of claim 10, further comprising writing a pattern of ones and zeros into the memory, wherein the error-reporting signal indicates a relative abundance of zero-to-one and one-to-zero bit errors.

13. The method of claim 12, further comprising correlating the errors to a location of the portable computing device, wherein the error-reporting signal identifies the location.

14. A method of alerting a mobile-phone user to a dangerous level of high-energy-particle emissions, the method comprising:
    receiving error-reporting signals from a plurality of mobile phones, each mobile phone having memory and adapted to communicate with a wireless network;
    correlating each of the error-reporting signals with a position of the one of the plurality of mobile phones issuing the error-reporting signal to accumulate error data;
    analyzing the error data to measure high-energy particle emissions in an area encompassing the user's mobile phone;
    deriving an emission reporting signal from the measure of high-energy particle emissions in the area encompassing the user's mobile phone; and
    transmitting the emission reporting signal from the wireless network to the user's mobile phone.

15. The method of claim 14, wherein the emission reporting signal indicates that the high-energy particle emissions in the area are at or above the dangerous level.

16. The method of claim 15, further comprising publishing the dangerous level of high-energy particle emissions and the corresponding position.

17. The method of claim 16, wherein the emission reporting signal directs the user to the published emissions and position.

18. The method of claim 16, wherein publishing includes displaying the emissions and position on a Web page.

19. The method of claim 14, wherein correlating each of the error-reporting signals with a position of the one of the plurality of mobile phones issuing the error-reporting signal includes receiving position information from the mobile phones.

20. The method of claim 14, wherein correlating each of the error-reporting signals with a position of the one of the plurality of mobile phones issuing the error-reporting signal includes triangulating the position with a plurality of cell towers.

21. A mobile phone for communicating over a network of cell sites, the phone comprising:
- a memory to store information as a plurality of bits susceptible to transient state changes caused by high-energy particles, wherein the transient state changes corrupt the stored information;
- an application processor coupled to the memory to execute instructions stored in the memory, wherein the instructions direct the application processor to issue an error signal responsive to the state changes that corrupt the stored information;
- a GPS receiver to provide position data, wherein the application processor correlates the error signal with contemporaneous position data; and
- a wireless network interface coupled to the application processor to transmit a wireless error-reporting signal to the network reporting the error signal.

22. The mobile phone of claim 21, wherein the error-reporting signal includes the contemporaneous position data.

* * * * *